United States Patent [19]

Imura

[11] 3,950,770
[45] Apr. 13, 1976

[54] SINGLE-LENS REFLEX CAMERA HAVING ELECTRONIC SHUTTER

[75] Inventor: Toshinori Imura, Sakai, Japan

[73] Assignee: Minolta Camera Kabushiki Kaisha, Osaka, Japan

[22] Filed: June 20, 1974

[21] Appl. No.: 481,277

[30] Foreign Application Priority Data

June 29, 1973 Japan.................. 48-79397

[52] U.S. Cl................................. 354/152; 354/234
[51] Int. Cl.².................. G03B 19/12; G03B 9/58
[58] Field of Search....... 354/48, 50, 154, 152, 234, 354/235

[56] References Cited
UNITED STATES PATENTS

| | | | |
|---|---|---|---|
| 3,683,776 | 8/1972 | Oro | 354/154 |
| 3,698,304 | 3/1970 | Tenkumo | 354/234 |
| 3,715,964 | 2/1973 | Tenkumo | 354/152 |
| 3,759,156 | 10/1973 | Kobou | 354/48 |

Primary Examiner—L. T. Hix
Assistant Examiner—E. M. O'Connor
Attorney, Agent, or Firm—Wolder & Gross

[57] ABSTRACT

An apparatus includes a control member to be actuated in operative relation to the swing-up motion of the mirror and a mechanical latch member selectively settable in a second position for electronic exposure time control and in a first position for mechanical exposure time control, the latch member being adapted to regulate at the first position the movement of an attraction member for detecting whether an electromagnet has been energized or unenergized. If it is detected that the electromagnet is inoperative when the apparatus is set for operation under electronic exposure time control, the apparatus can be made operative under mechanical exposure time control. The apparatus further includes means for preventing return of the mirror to the observing position upon detecting the inoperativeness of the electromagnet. The mirror is returnable to the normal observing position by switching the apparatus to mechanical exposure time control.

5 Claims, 12 Drawing Figures

SINGLE-LENS REFLEX CAMERA HAVING ELECTRONIC SHUTTER

BACKGROUND OF THE INVENTION

The present invention relates to a single-lens reflex camera having an electronic shutter and including means for mechanically controlling exposure time, more particularly to improvements in an apparatus by which when it is detected that the shutter of such camera set for electronic exposure time control fails to operate normally due to the drain of power source battery upon tripping the shutter, the return motion of the mirror to the observing position is interrupted by latching and the failure is indicated within the finder for warning.

Conventionally, cameras incorporating an electronic shutter are known which, when the shutter is inadvertently tripped although the shutter is no longer normally operable due to the drain of power source battery, the release mechanism is adapted to be locked or the mirror is latched in the course of its motion, thereby giving notice to the trouble of the shutter.

With such conventional cameras, however, it is impossible to make the electronic shutter normally operable simply by replacing the power source battery by a new one, but it becomes serviceable only when a resetting mechanism is manipulated to unlock the shutter release or to return the mirror to the normal position.

Thus the known cameras of the type described essentially require the resetting mechanism which is troublesome to operate and which makes the shutter construction complex.

SUMMARY OF THE INVENTION

An object of this invention is to overcome the foregoing drawbacks of conventional apparatuses and to provide an electronic shutter apparatus which has means for mechanically controlling exposure time and which is simplified in construction to the greatest possible extent.

Another object of this invention is to provide an electronic shutter apparatus by which when the drain of power source battery is detected and the mirror is prevented from return motion, the camera can be switched to operation under mechanical exposure time control by a very simple procedure to thereby return the mirror to position and to make the camera subsequently operable under mechanical exposure time control.

According to this invention, an attraction member for detecting energization or unenergization of an electromagnet is controlled by a control member in the initial stage of the operation of the control member which is actuated in operative relation to the swing-up motion of the mirror. Furthermore there is provided a mechanical latch member which is movable between a first position for mechanical exposure time control and a second position for electronic exposure time control and is settable in these positions by means for switching the shutter to electronic exposure time control and to mechanical exposure time control. The mechanical latch member, as set in the first position, comes into frictional engagement with the attraction member which is actuated by a shutter tripping action, thereby preveting the movement of a shutter closing member. The latch member is brought out of the engagement in operative relation to the travel of a shutter opening member which is initiated into movement almost in the final stage of the movement of the control member, so as to permit the travel of the shutter closing member. When set in the second position, the latch member is kept out of engagement with the attraction member, independent of the energization or unenergization of the electromagnet.

Thus only by changing the set position of the latch member, the camera is set for electronic exposure time control or for mechanical exposure time control.

The apparatus of this invention further includes a signal member to be controlled by the foregoing operation of the control member and by the movement of the attraction member, and a blocking member to be controlled by the signal member and the switching member, such that initially when the apparatus is set for electronic exposure time the blocking member is set in a first position for impeding the return of the mirror from its swung-up position (photographing position) to the observing position, whereas upon detecting that the electromagnet is normally operable, the blocking member is shifted by the signal member to a second position where it does not prevent the return of the mirror, the blocking member being settable in the second position in operative relation to the switching means when the apparatus is set for mechanical exposure time control.

Thus if it is detected that the electromagnet is not normally operable due to the drain of power source battery when the camera is set for electronic exposure time control, the return of the mirror is impeded, giving warning of the failure within the finder. The switching means is then operated to set the apparatus for mechanical exposure time control, and the mirror is released by this movement and returned to the normal observing position to render the camera thereafter operable under mechanical exposure time control.

Other objects and features of the present invention will become more apparent from the following description.

DESCRIPTION OF THE PREFERRED EMBODIMENTS

Figure 1:
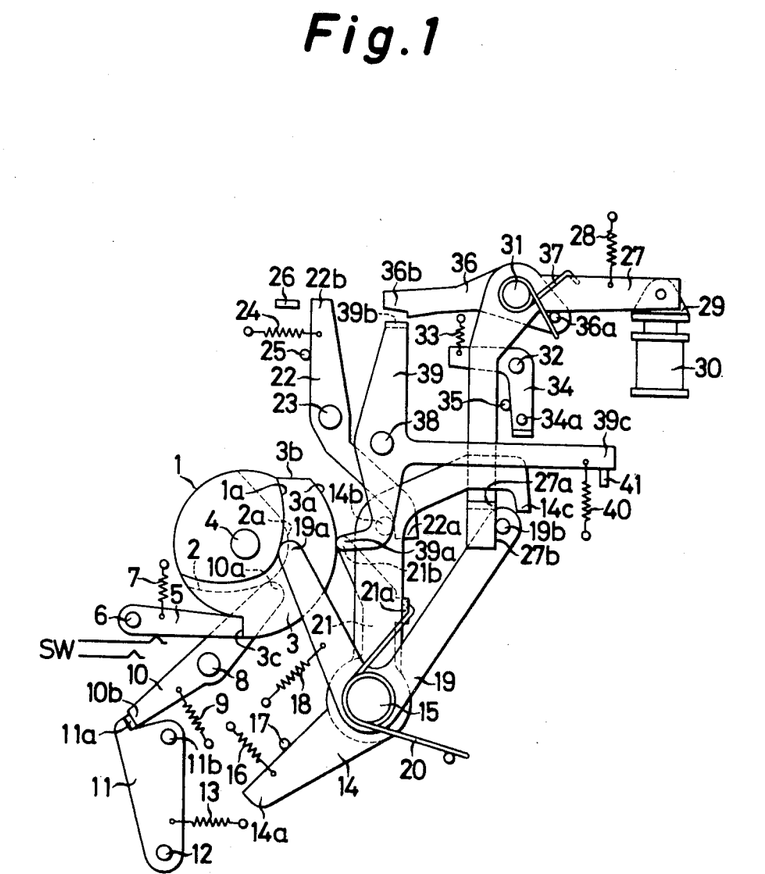
FIG. 1 is a front view showing the principal portion of an embodiment of the present invention when the shutter is in cocked position for mechanical exposure time control.

With reference to FIG. 1, three control cams 1, 2 and 3 serving as control members are rotatable together about a pin 4 and are biased in a clockwise direction by an unillustrated spring. They are held in cocked position by a cam retaining lever 5.

The first control cam 1 has a cam surface 1a whose radius increases progressively when turned in a clockwise direction. The second control cam 2 has a cam surface 2a the radius of which increases markedly over a specified angle of rotation. The third control cam 3 has a cam surface 3a defined by a portion of a circle concentric with the pin 4 and another cam surface in the form of a stepped portion extending from the terminal end of the cam surface 3a. The third control cam 3 has a cutout portion 3c in which the cam retaining lever 5 is engageable, whereby the three control cams 1, 2 and 3 are held in cocked position.

The cam retaining lever 5 pivoted to a pin 6 is biased in a counterclockwise direction by a spring 7 and is turned in a clockwise direction by way of unillustrated interlocking means by the swing-up motion of a mirror (see FIG. 8) in operative relation to a shutter tripping action, whereupon the control cams 1, 2 and 3 are freed from their cocked position and initiated into clockwise movement.

A lever 10 for retaining a first blind (shutter opening member) is pivoted to a pin 8 and urged by a spring 9 in a counterclockwise direction. The front end 10a of the lever 10 is held in sliding contact with the cam surface 2a of the second control cam 2. The rear end 10b of the lever 10 engages a lug 11a of a first blind driving lever 11 which has been turned in a counterclockwise direction by a shutter cocking action to latch the lever 11 in its cocked position.

The first blind driving lever 11 for directly or indirectly driving the shutter opening member (first blind) with its clockwise movement is pivoted to a pin 12 and urged by a spring 13 in a clockwise direction. The lever 11 has a pin 11b which, in the course of the clockwise movement of the lever 11, comes into contact with the rear end 14a of a mechanical latch lever 14 serving as a latch member set in a first potition, the lever 14 thus being movable by the pin 11b.

The mechanical latch lever 14 is selectively settable in the first and second positions and is movable from the first position to the second position under the control of the control member and in operative relation to the travel of the shutter opening member. The lever 14 is pivotally mounted on a pin 15 and urged by a spring 16 in a clockwise direction. When cocked by a mechanical exposure time setting action, the lever 14 is set in the first position, with its rear end 14a in contact with a stopper 17.

Also pivotally mounted on the pin 15 are a holding lever 19 biased by a spring 18 in a counterclockwise direction and a control transmitting lever 21 biased in a counterclockwise direction by a spring 20 which is stronger than the spring 16 biasing the mechanical latch lever 14. The lever 21 has a lug 21a bearing against the mechanical latch lever 14 and a front end 21b in sliding contact with the cam surface 3a of the third control cam 3.

The mechanical latch lever 14 has a pin 14b in engagement with the lower end 22a of a switch lever 22. The mechanical latch lever 14 is selectively movable to the first and second positions by a switching action.

The switch lever 22 is pivoted to a pin 23 and biased by a spring 24 in a counterclockwise direction. When bearing against a stopper 25, the switch lever 22 has its upper end 22b positioned in the path of advance of a switching effecting lever 26, such that when moved as will be described later, the lever 26 brings the mechanical latch lever 14 to the aforementioned position by way of the switch lever 22.

The mechanical latch lever 14 further has a hook portion 14c at its upper end which, when the lever 14 is set in the first position, is brought to the position where it prevents the counterclockwise movement of an anchor lever 27 serving as an attracting member for actuating a shutter closing member (second blind), namely to the position where it prevents the actuation of the closing member. When the lever 14 is set in or moved to the second position, the anchor lever 27 is rendered movable in a counterclockwise direction.

Under the action of the spring 18 which urges the holding lever 19 in a counterclockwise direction, one end 19a of the lever 19 is held in sliding contact with the cam surface 1a of the first control cam 1, whilst a pin 19b on the other end of the lever 19 is kept in contact with the lower end 27b of the anchor lever 27 which is urged in a counterclockwise direction by a spring 28 which is weaker than the spring 18, whereby the lever 27 is forced in a clockwise direction, an attraction piece 29 at one end thereof being thereby pressed against an electromagnet 30.

The anchor lever 27 pivoted to a pin 31 is movable, while the electromagnet 30 is unenergized, in a counterclockwise direction under the action of the spring 28 to follow the clockwise turning of the holding lever 19. The counterclockwise movement of the lever 27 is regulated by the engagement of the hook portion 14c of the mechanical latch lever 14 with a lug 27a of the lever 27. While out of engagement with the lever 14 or when disengaged therefrom, the lever 27 movable over the entire course of its counterclockwise movement. Through the full counterclockwise movement, the lever 27 comes into contact with a pin 34a on a second blind (shutter closing member) retaining lever 34 which is pivoted to a pin 32 and urged in a clockwise direction by a spring 33 weaker than the spring 28 to force the lever 34 in a counterclockwise direction, thereby permitting the shutter closing member to travel. The second blind retaining lever 34 is held by a stopper 35 in cocked position.

Further pivotally mounted on the pin 31 for the anchor lever 27 is a signal retaining lever 36 which is urged in a counterclockwise direction by a spring 37 acting both on the lever 36 and lever 27, a pin 36a on the lever 36 thereby being held in engagement with the anchor lever 27. Accordingly, the lever 36 is turnable to follow the counterclockwise movement of the anchor lever 27.

A signal lever 39 pivoted to a pin 38 and urged by a spring 40 in a clockwise direction has one end 39a which is in sliding contact with the cam surface 3a of the third control cam 3, substantially at the same position as the end 21b of the control transmitting lever 21. The lever 39 further has a lug 39b at its upper end which is engageable with the engaging portion 36b of the signal retaining lever 36. The rear end 39c of the lever 39 is in engagement with a mirror operating lever 41. Thus when the anchor lever 27 turns counterclockwise while the electromagnet 30 remains unenergized, the signal retaining lever 36 follows this movement to bring its engaging portion 36b into engagement with the lug 39b of the signal lever 39, which is in turn prevented from clockwise movement.

Figure 6:
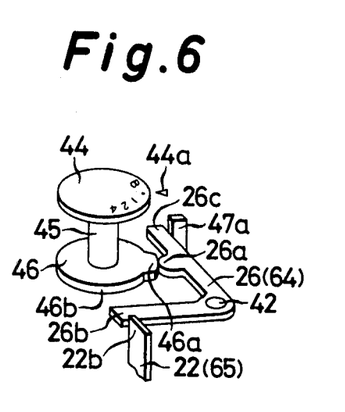
FIG. 6 is a perspective view showing an example of a mechanism for switching the apparatus to electronic exposure time control and to mechanical exposure time control.
Figure 7:
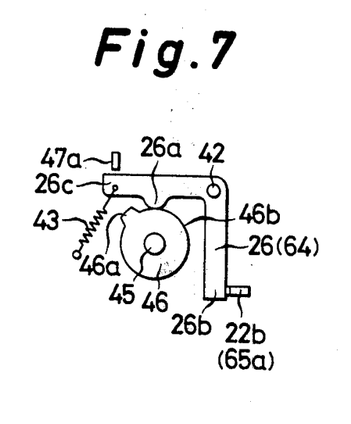
FIG. 7 is a plan view of FIG. 6.
Figure 8:
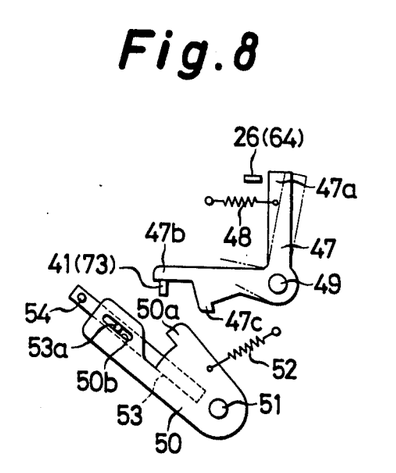
FIG. 8 is a front view showing an example of a mirror retaining mechanism.

As illustrated in FIGS. 6 to 8, the switching effecting lever 26 pivoted to a pin 42 is urged by a spring 43 in a counterclockwise direction and has a projection 26a in sliding contact with a cam 46 fixedly mounted on a pin 45 for a shutter speed dial 44. The lever 26 has one end 26b so disposed as to be engageable with the upper end 22b of the switch lever 22 and the other end 26c engageable with one end 47a of a mirror retaining lever 47 serving as a member for preventing return of the mirror 53 from the photographing position to the observing position. The engagement of the projection 26a with a cam projection 46a turns the lever 26 in a clockwise direction, pushing the mirror retaining lever to the position shown in the phantom line in FIG. 8, whereby the switch lever 22 is brought to the position of FIG. 1 to set the mechanical latch lever 14 in the first position.

Figure 3:
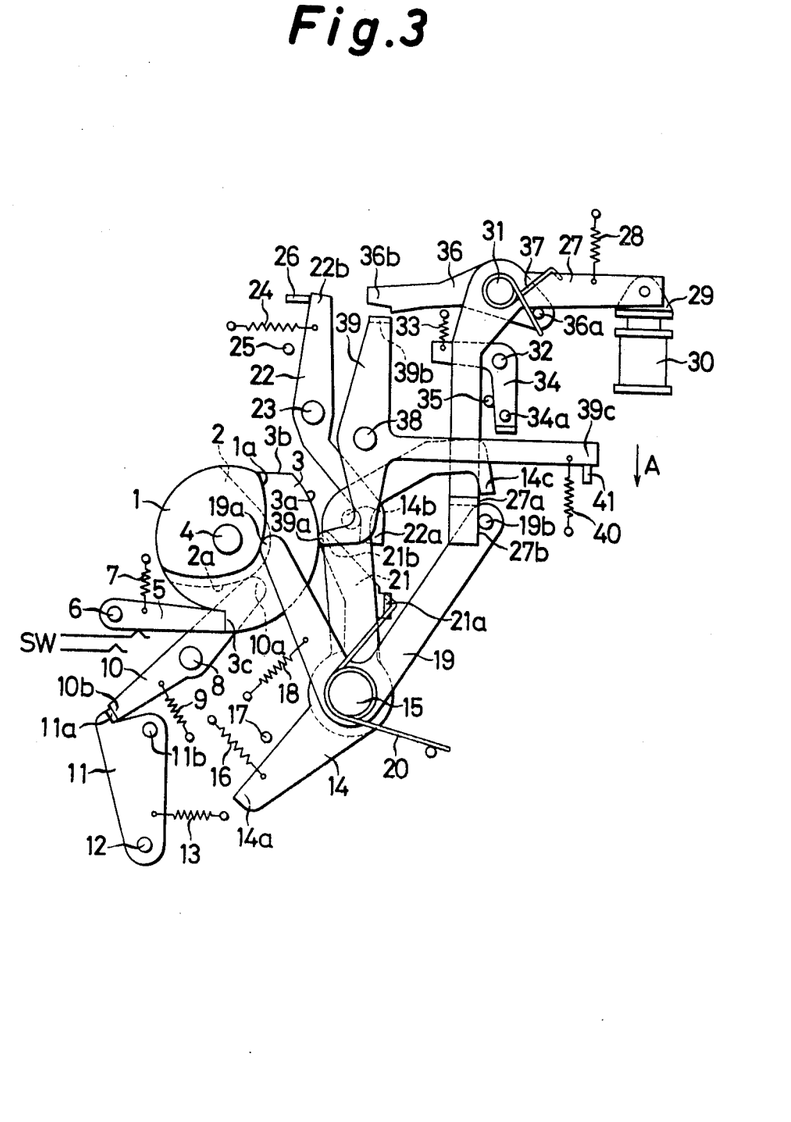
FIG. 3 is a view showing the apparatus of FIG. 1 in cocked position for electronic exposure time control.

On the other hand, when the projection 26a comes into engagement with the unprojected portion 46b of the cam 46, the switching effecting lever 26 is returned in a counterclockwise direction, permitting the mirror retaining lever 47 to be returned to the solid-line position shown in FIG. 8 by the action of a spring 48. Consequently, the end 26b pushes the switch lever 22 in a clockwise direction to set the mechanical latch lever 14 in the second position as seen in FIGS. 3 and 7. To sum up, in FIGS. 1 and 6 wherein the dot mark on the speed dial 44 is set to an index mark 44a, the mechanical latch lever 14 is set in the first position by way of the switch lever 22, and in this position the shutter is rendered operable under mechanical exposure time control, whilst in FIGS. 7 and 3 the projection 26a is in sliding contact with the unprojected portion 46b of the cam 46, with the mechanical latch lever 14 set in the second position by means of the switch lever 22, and in this position the shutter is operable under electronic exposure time control.

The mirror retaining lever 47 pivoted to a pin 49 is urged in a counterclockwise direction by the spring 48 and has its end 47b in engagement with the mirror operating lever 41 when the lever 47 is in the solid-line position in FIG. 8. The lever 47 has a hook 47c engageable with the hook 50a of a mirror driving lever 50.

The mirror driving lever 50 is pivoted to a pin 51 and urged in a clockwise direction by a spring 52. The lever 50 has a slot 50b in which engages the pin 53a of a mirror 53. The reciprocal pivotal movement of the lever swings the mirror 53 up and down about the pin 54. The mirror 53 which is usually in the illustrated observing position is swung upward by the mirror driving lever 50 movable by known mirror driving means and is held in the photographing position by an unillustrated member. Through unillustrated known means operable in response to a signal indicating the completion of travel of the second blind, the mirror driving lever 50 is returned in a counterclockwise direction to the observing position.

Further when the mirror driving lever 50 is turned in a clockwise direction with the mirror retaining lever 47 in the solid-line position (first position) in FIG. 8, the hook 50a strikes the hook 47c of the mirror retaining lever 47, thereby pushing the lever 47 in a clockwise direction for a moment. Upon the hook 50a passing by the hook 47c, the mirror retaining lever 47 returns to the solid-line position.

Through unillustrated means, the clockwise movement of the mirror driving lever 50 turns the cam retaining lever 5 in a clockwise direction, initiating the control cams 1, 2 and 3 into clockwise movement.

Further when the mirror retaining lever 47 is in the solid-line position of FIG. 8, namely in the first position, the mirror driving lever 50 is latched by the lever 47 immediately after the initiation of its return movement, with the result that an unusual image will be observed in the finder due to the interruption of the return of the mirror 53, this giving the warning that the electronic shutter is not in normal state. The mirror retaining lever 47 which has engaged the mirror 53 in the course of return can be pushed to the phantom-line position (second position) in FIG. 8 by the switch lever 26. It can also be pushed to the second position by the morror operating lever 41 with the movement to be described later. Thus the mirror 53 can be returned to the normal observing position by being freed from engagement in the course of its return movement. The mirror retaining lever 47 pushed to the second position remains out of engagement with the mirror driving lever 50, permitting the mirror 53 to reciprocally swing normally.

FIG. 3 shows the switching effecting lever 26 set for electronic exposure time control, with the switch lever 22 pushed against the spring 24. The mechanical latch lever 14 has been turned counterclockwise to the second position by the lower end of the lever 22, with its hook portion 14c shifted to a position where it is not longer engageable with the lug 27a of the anchor lever 27. The shutter is in its cocked position. By the foregoing movement of the switching effecting lever 26, the mirror retaining lever 47 shown in FIG. 8 is in the first position indicated in the solid line in the figure, with the other end 47b in contact with the mirror operating lever 41.

When the shutter is tripped in FIG. 3, the cam retaining lever 5 closes a power source switch SW in operative relation to the swing-up motion of the mirror 53. If the voltage of power source battery is at a sufficiently high lever, the electromagnet 30 is energized upon closing of the switch SW to hold the attraction piece attracted thereto. Consequently, the anchor lever 27 is held in the position of FIG. 3 by being electromagnetically prevented from counterclockwise movement against the action of the spring 28.

After closing the power source switch SW, the clockwise turning of the cam retaining lever 5 releases the control cams 1, 2 and 3 from cocked position, whereupon the control cams 1, 2 and 3 are initiated into clockwise motion under the spring action.

By virtue of the above movement of the control cams 1, 2 and 3, the holding lever 19 in sliding contact with the first control cam 1 is turned clockwise against the spring 18, whereby the pin 19b is disengaged from the side face of the lower end 27b of the anchor lever 27 to free the lever 27 from the pressure. As already described, however, the anchor lever 27 is electromagnetically prevented from turning.

Through further clockwise rotation of the control cams 1, 2 and 3, the ends 21b and 39b of the control transmitting lever 21 and of the signal lever 39 in sliding contact with the cam surface 3a of the third control cam 3 come into engagement with the stepped portion 3b extending from the cam surface 3a under the action of the springs 20 and 40. Accordingly, the control transmitting lever 21 is turned in a counterclockwise direction, while the signal lever 39 is turned in a clockwise direction.

Figure 4:
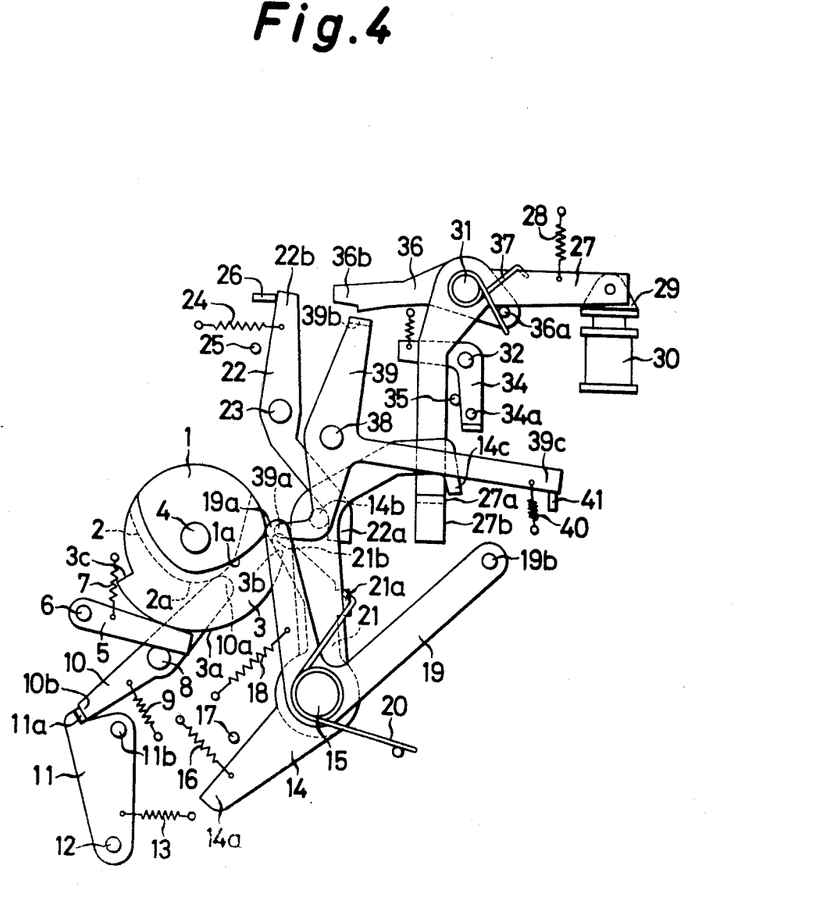
FIG. 4 is a similar view showing the member for actuating the shutter closing member as electromagnetically retained upon tripping the shutter.

When thus turned, the signal lever 39 pushes, with its rear end 39c, the mirror operating lever 41 in the direction of the arrow A, whereby the mirror retaining lever 47 shown in FIG. 8 is pushed to the second position indicated in the phantom-line in the figure. Inasmuch as the switching effecting lever 21 has already shifted the mechanical latch lever 14 to the second position where it is free of interference with the anchor lever 27, the control transmitting lever 21 thereafter turned as above does not participate in shutter control action. The parts are now so positioned as illustrated in FIG. 4.

Approximately at the final stage of the clockwise movement of the control cams 1, 2 and 3, this movement turns the first blind retaining lever 10 in a clockwise direction which lever is in sliding contact with the second control cam 2, thereby releasing the first blind driving lever 11 from its cocked position and allowing the same to turn clockwise under the action of the spring 13. Consequently, the shutter opening member travels and, at the same time, an unillustrated count switch is opened to start to count the exposure time.

Upon lapse of the count time determined by the resistivity of the photocell and capacitor of the known electronic shutter circuit, the switching action of the circuit deenergizes the electromagnet 30, releasing the attraction piece 29 from the attracting surface of the magnet 30 and consequently causing the spring 28 to turn the anchor lever 27 in a counterclockwise direction. The lever 27 pushes the pin 34a on the second blind retaining lever 34 with the side face of the downwardly extending portion of the lever 27 and turns the lever 34 in a counterclockwise direction, permitting the shutter closing member to travel to complete an exposure. In this way, the shutter operation is completed under electronic exposure time control. In response to a signal indicating the completion of travel of the closing member, the mirror 53 is returned to the observing position, whereby the photographic operation is completed. Since the mirror retaining lever 47 has been pushed to the second position, the mirror driving lever 50 remains out of engagement with the lever 47 during the return motion of the mirror 53, assuring the return of the mirror 53 to the normal observing position.

If the power source battery has been consumed and the voltage is too low to give a sufficient attracting force for a shutter tripping action described above, the electromagnet 30 fails to hold the attraction piece 29 attracted thereto against the spring action on the anchor lever 27 even when the clockwise movement of the cam retaining lever 5 closes the power source switch SW.

Accordingly, when the holding lever 19 turns clockwise due to the clockwise rotation of the control cams 1, 2 and 3 from their cocked position, the anchor lever 27 follows this movement and turns counterclockwise, allowing the signal retaining lever 36 to turn counterclockwise which lever is adapted to follow the anchor lever 27 by the spring 37. As a result, the stepped portion 36b engages the upper end lug 39b of the signal lever 39 and prevents the lever 39 from turning in a clockwise direction.

With the mechanical latch lever 14 set in the second position as already described, the anchor lever 27 continues to turn in a counterclockwise direction, pushing the second blind retaining lever 34 in a counterclockwise direction with its side face to release the shutter closing member from its cocked position. However, since the shutter opening member is still retained in its cocked position, the closing member released from the cocked position is allowed to travel a small distance by known means and is engaged by the shutter opening member and prevented from further travel.

Figure 5:
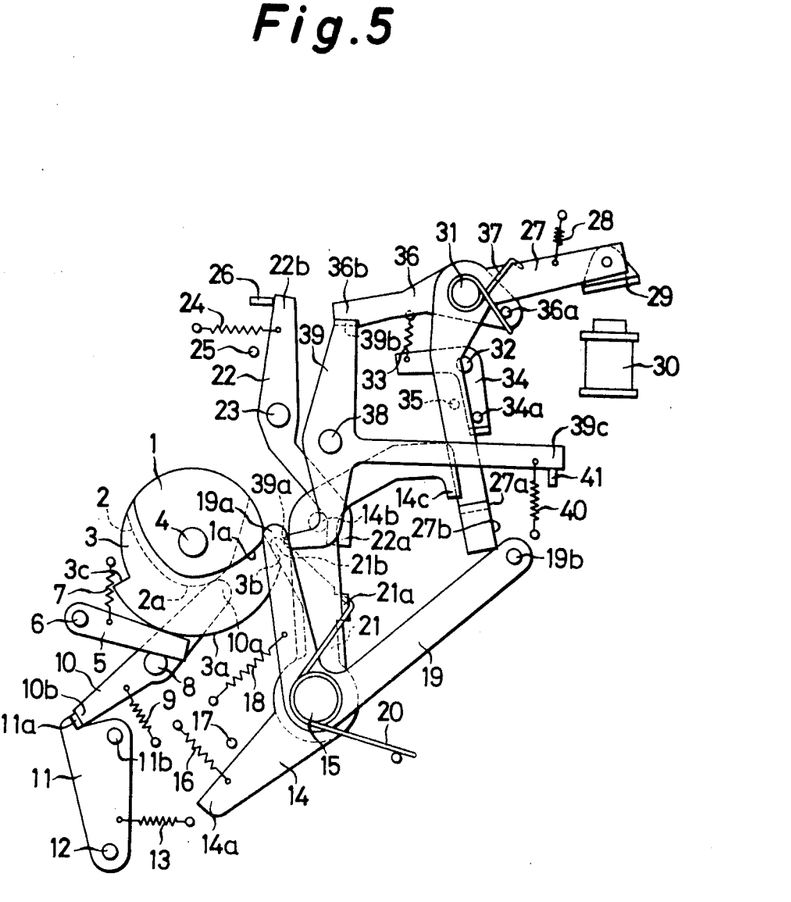
FIG. 5 is a view showing the positions of the parts in FIG. 3 when the electromagnet remains unenergized upon tripping the shutter.

By virtue of further clockwise movement of the control cams 1, 2 and 3, the end 21a of the control lever 21 in sliding contact with the third control cam 3 comes into engagement with the stepped portion 3b, the lever 21 thereby being turned in a counterclockwise direction. However, since the mechanical latch lever 14 has already been set in the second position, the abovementioned movement is independent of the shutter operation. On the other hand, the signal lever 39 remains latched by the signal retaining lever 36 against clockwise movement even when the stepped portion 3b of the cam 3 reaches the position of the end 39a. Consequently, the parts assume the positions shown in FIG. 5. Since the mirror operating lever 41 remains in position, the mirror retaining lever 47 in FIG. 8 is held in the first position, with its hook 47c located in the path of movement of the hook 50a during the return of the mirror driving lever 50.

Approximately in the final stage of further clockwise rotation of the control cams 1, 2 and 3, the second control cam 2 turns the first blind retaining lever 10 in a clockwise direction as already described to release the first blind driving lever 11 from its cocked position, with the result that the shutter opening member and closing member travel at the same time as engaged with each other. Thus the travel of both the shutter opening and closing members is completed without making an exposure.

The signal indicating the completion of travel of the shutter closing member turns the mirror driving lever 50 in a counterclockwise direction so as to return the mirror 53 from the photographic position to the observing position, but in the course of the return movement, the hook 50b of the mirror driving lever 50 engages the hook 47c of the mirror retaining lever 47, whereby the counterclockwise turning of the mirror driving lever 50 is prevented to impede the return of the mirror 53 to the normal observing position. Consequently, an unusual image will be observed in the finder field, thereby giving the warning that the battery has been consumed.

If the drain of the power source battery is indicated in this way, the shutter speed dial 44 shown in FIG. 6 is operated to bring the mirror 53 back to the normal observing position. More specifically, the dial 44 is moved to set the dot mark thereon to the index mark 44a, the dot mark being the indication of mechanical exposure time control. This causes the cam projection 46a to push the switching effecting lever 26 in a clockwise direction, thereby bringing the mirror retaining lever 47 to the phantom-line position (second position) in FIG. 8 to disengage the hook 47c from the hook 50a of the mirror driving lever 50. The mirror driving lever 50 is therefore turned in a counterclockwise direction and returns the mirror 53 to the normal observing position.

Inasmuch as the shutter opening member and closing member have already completed their travel, the shutter is subsequently cocked. When the shutter is completely cocked, the parts are in the positions for mechanical exposure time control shown in FIG. 1. It is also possible to manipulate the shutter speed dial 44 after cocking the shutter. In either case, the shutter is brought to the same cocked position.

If the battery is replaced by a new one and the shutter speed dial 44 is set for electronic exposure time control, the electronic shutter will function for photographic operation.

Mechanical exposure time control will now be described. FIG. 1 shows the shutter in cocked position operable under mechanical exposure time control.

It is seen that the switching effecting lever 26 is away from the upper end 22b of the switch lever 22, which is pulled to position as determined by the stopper 25. The mechanical latch lever 14 is set in the first position, with the pin 14b in engagement with the lower end 22a of the switch lever 22. The hook portion 14c is positioned in the path of movement of the lug 27a of the lever 27 during the clockwise movement of the anchor lever 27.

In this state, the shutter is tripped, whereupon the mirror 53 is swung upward and, in operative relation to this movement, the cam retaining lever 5 is turned in a clockwise direction to close the power source switch SW. In this case, however, the circuit of the electromagnet 30 has been opened to interrupt the flow of current to the magnet, since the shutter is set for mechanical exposure time control.

The control cams 1, 2 and 3 released from the cam retaining lever 5 are initiated into clockwise movement by the spring action, whereupon the first control cam 1 turns the holding lever 19 in a clockwise direction, followed by the counterclockwise movement of the anchor lever 27, but the counterclockwise turning of the anchor lever 27 is interrupted, before the lever 27 pushes the second blind retaining lever 34 by the engagement of the lug 27a of the lever 27 with the hook portion 14c of the mechanical latch lever 14 set in the first position, because the hook portion 14c is located in the path of advance of the lug 27a. In the meantime, the signal retaining lever 36 following the counterclockwise movement of the anchor lever 27 brings its stepped portion 36b into engagement with the upper end lug 39b of the signal lever 39 and prevents the lever 39 from turning clockwise. The above-mentioned engagement between the anchor lever 27 and the mechanical latch lever 14 is effected with frictional contact under the action of the spring 28.

Through further rotation of the control cams 1, 2 and 3, the stepped portion 3b of the third control cam 3 reaches the position of the ends 21b and 39a of the control transmitting lever 21 and signal lever 39 which are in sliding contact with the cam 3. However since the signal lever 39 is prevented from turning clockwise by the signal retaining lever 36, whilst the mechanical latch lever 14 is in frictional engagement with the anchor lever 27 with a frictional force which is greater than the counterclockwise force of the spring 20 delivered from the control transmitting lever 21 via the lug 21a to the mechanical latch lever 14, the control transmitting lever 21 is prevented from turning counterclockwise. Thus the parts are brought to the positions shown in FIG. 2, the ends 21b and 39a being held out of engagement with the stepped portion 3b.

Figure 2:
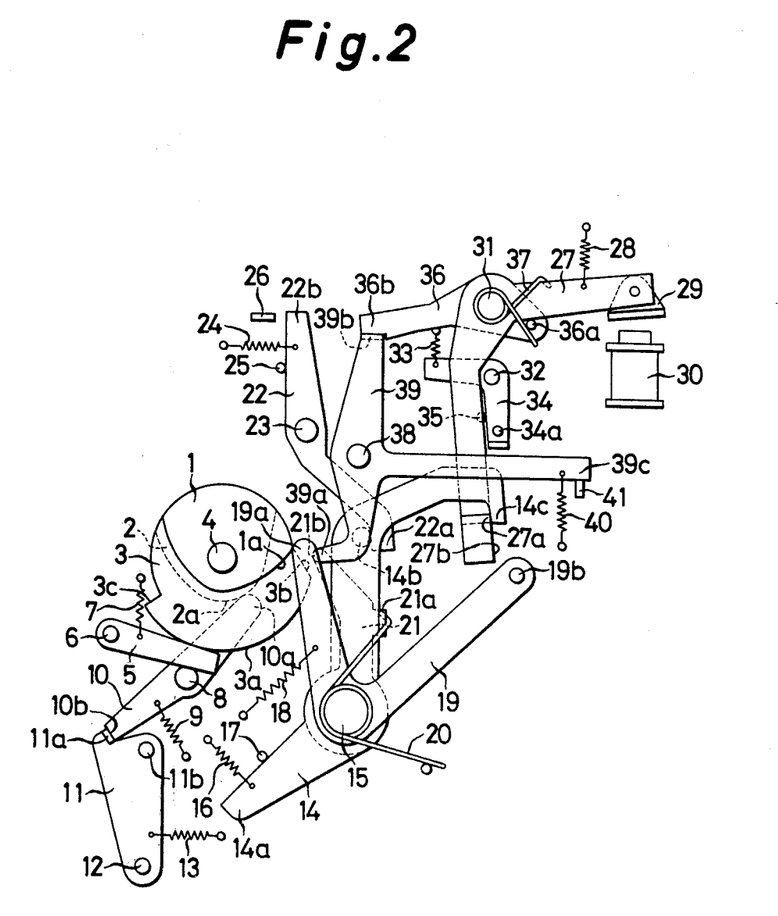
FIG. 2 is a similar view showing the member for actuating a shutter closing member as mechanically retained upon tripping the shutter.

In the almost final stage of the clockwise rotation of the control cams 1, 2 and 3, the first blind retaining lever 10 is turned in a clockwise direction by the second control cam 2 to release the first blind driving lever 11 from its cocked position and to thereby permit the shutter opening member to travel.

When the shutter opening action is almost completed after the first blind driving lever 11 is turned clockwise, the pin 11b comes into contact with the rear end 14a of the mechanical latch lever 14 and forces the lever 14 in a counterclockwise direction against the frictional force referred to above. The anchor lever 27 is therefore released from the hook portion 14c and is turned further counterclockwise from its latched position, turning the second blind retaining lever 34 in a counterclockwise direction. This allows the shutter closing member to travel for the completion of an exposure.

In response to a signal indicating the completion of travel of the shutter closing member, the mirror driving lever 50 is turned in a counterclockwise direction to return the mirror 53 to the normal observing position. At this time, the mirror 53 returns free of any trouble since the mirror retaining lever 47 has been brought to the second position indicated in the phantom line in FIG. 8 by the setting of the switching effecting lever 26 to the position for mechanical exposure time control.

Figure 9:
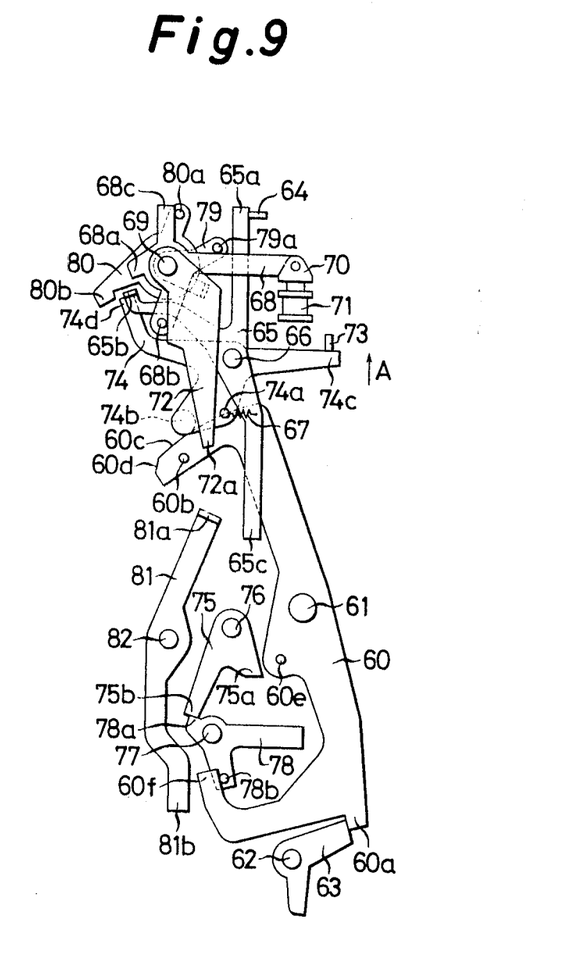
FIG. 9 is a front view showing the principal portion of another embodiment of this invention when the shutter is in cocked position for electronic exposure time control.

FIG. 9 shows another embodiment of this invention in which the three control cams 1, 2 and 3 serving as control members in the embodiment of FIG. 1 are replaced by one control member 60. An intermediate lever 81 is provided between a first blind driving lever 78 and a mechanical latch lever 65. The control transmitting lever for the mechanical latch lever 65 is eliminated, such that the mechanical latch lever 65 is directly settable in the first and second positions by a switching effecting lever 64 coupled to the shutter speed dial. When the switching effecting lever 64 is set for mechanical exposure time control, the mechanical latch lever 65 is immediately set in the first position where it is engageable with an anchor lever 68. A spring 67 is provided between the latch lever 65 and a pin 74a provided on a signal lever 74, the pin 74a being serviceable also as a stopper for the mechanical latch lever 65. The anchor lever 48, signal retaining lever 80 and second blind retaining lever 79 are pivotally mounted on a pin 69 to make the construction compact. In these features, this embodiment is different from the foregoing but operates almost in the same manner as the previous embodiment.

FIG. 9 shows the shutter in cocked position for electronic exposure time control. The control member 60 pivotally mounted on a pin 61 and urged in a clockwise direction by an unillustrated spring is turnable counterclockwise to the illustrated position by a cocking action and is latched in its cocked position when a projection 60a at its lower portion is engaged by a cam retaining lever 63 which is pivoted to a pin 62 and urged by an unillustrated spring in a counterclockwise direction. By the cocking action, other members are moved directly or indirectly by the control member 60 in operative relation thereto or are individually moved in operative relation thereto by other means, whereby parts are set in the illustrated positions.

In operative relation to the shutter speed dial (see FIG. 6), the switching effecting lever 64 is settable for electronic exposure time control or for mechanical exposure time control. When the lever 64 is set in position for electronic exposure time control, the upper end 65a of the mechanical latch lever 65 serving also as a switch lever is pushed leftward, and the lever 65 is thereby turned in a counterclockwise direction about a pin 66 against the action of the spring 67 and is set in the second position in which a lug 65b at the end of an arm thereof is retracted from the path of advance of the rear end 68a of the anchor lever 68 during the counterclockwise movement of the lever 68.

The anchor lever 68 pivoted to a pin 69 and urged in a counterclockwise direction by an unillustrated spring has an attraction piece 70 opposing the attracting surface of an electromagnet 71. When the lever 68 is in its cocked position, a holding lever 72 pivoted to the same pin 69 clockwisely presses a pin 68b on the end of a downwardly extending arm, whereby the attraction piece 70 is pressed against the attracting surface of the electromagnet 71.

As already described with reference to FIGS. 7 and 8, the switching effecting lever 64 sets the mirror retaining lever 47 in the first position in which it is engageable with the mirror driving lever 50 in the course of return movement of the lever 50. A mirror operating lever 73 regulates the engagement of the mirror retaining lever 47 with the mirror driving lever 50.

When the shutter is tripped in the above state, the cam retaining lever 63 turns in a clockwise direction in operative relation to the swing-up motion of the mirror 53 and first closes an unillustrated power source switch. If the power source battery has a voltage high enough to effect a normal shutter action, the electromagnet 71 is energized to hold the attraction piece 70 attracted and to thereby electrically hold the anchor lever 68 in the position of FIG. 9.

When further turned clockwise, the cam retaining lever 63 releases the control member 60 from its cocked position. Under the action of an unillustrated spring, the control member 60 starts to turn in a clockwise direction.

By virtue of the clockwise movement of the control member 60, a pin 60b on the member 60 comes into contact with the lower end 72a of the holding lever 72, which is in turn pushed in a counterclockwise direction against the spring (not shown) acting thereon to free the anchor lever 68 from the clockwise mechanical pressing force. However, since the anchor lever 68 is electrically held attracted to the electromagnet 71 by means of the attraction piece 70, the lever 68 is prevented from turning in a counterclockwise direction against the spring force.

The control member 60 has a cam surface 60c in sliding contact with a pin 74b on the signal lever 74. The signal lever 74 is pivoted to the pin 66 and has a pin 74a serving as a stopper for the mechanical latch lever 65. The spring 67 extending between the pin 74a and the latch lever 65 biases the signal lever 74 in a counterclockwise direction to keep the pin 74b in sliding contact with the cam surface 60c.

Through further clockwise movement of the control member 60, the pin 74b drops from the cam surface 60c onto a stepped portion 60d extending therefrom, whereby the signal lever 74 is turned in a counterclockwise direction. The mirror operating lever 73 bearing against the arm 74c of the lever 74 is forced upward in the direction of the arrow A in FIG. 9 by virtue of the counterclockwise movement of the lever 74. Consequently, the mirror retaining lever 47 in FIG. 8 is turned from the first position to the second position indicated in the phantom line, the lever 47 thus being shifted to the position where it does not interfere with the return of the mirror driving lever 50.

The control member 60 turns further clockwise and, almost in the final stage of its movement, a pin 60e on the member 60 strikes the driven portion 75a of a first blind retaining lever 75 and turns the lever 75 about the pin 76 thereof in a clockwise direction against the unillustrated spring acting thereon.

The first blind retaining lever 75 in cocked position has an end 75b in engagement with a projection 78a of the first blind driving lever 78 supported by a pin 77 to retain the lever 78 in clocked position. When turned clockwise as above, the lever 75 releases the lever 78, which therefore turns in a clockwise direction under the action of an unillustrated spring, permitting the travel of a shutter opening member to initiate an exposure.

In timed relation to the travel of the shutter opening member, an unillustrated count switch is opened to initiate the counting action of known electronic shutter. Upon lapse of the exposure time in conformity with the brightness of the subject, the electromagnet 71 is deenergized.

Consequently, the anchor lever 68 turns in a counterclockwise direction under the action of spring and pushes a pin 79a on a second blind retaining lever 79 which is pivoted to the pin 69 and urged in a clockwise direction by an unillustrated spring. The lever 79 is forced in a counterclockwise direction to release a shutter closing member from its cocked position into travel and to complete the exposure.

In response to a signal indicating the completion of travel of the closing member, the mirror driving lever (FIG. 8) is turned in a counterclockwise direction as already described, whereby the mirror 53 is returned to the observing position to complete the photographing operation.

If the power source battery has been consumed and is unable to effect a normal shutter action when the shutter is tripped as above, the electromagnet 71 fails to give a sufficient magnetic force even if the power source switch is closed upon the shutter tripping action.

In such case, the anchor lever 68 is no longer electrically retainable when the control member 60 is initiated into clockwise movement as freed from its cocked position in operative relation to the swing-up motion of the mirror 53, since the electromagnetic attracting force of the magnet 71 on the attraction piece 70 is very feable or nil. As a result, when the holding lever 72 is pushed in a counterclockwise direction by the clockwisely turning control member 60, the anchor lever 68 is turned in a counterclockwise direction by the spring force acting thereon, following that movement.

The aforementioned signal retaining lever 80 is pivotably mounted on the pin 69 of the anchor lever 68 and urged in a counterclockwise direction by an unillustrated spring, with its pin 80a held in contact with an arm 68c of the anchor lever 68, the signal lever 80 thus being rendered turnable to follow the counterclockwise movement of the anchor lever 68. Formed at the rear end of the signal retaining lever 80 is a hook 80b engageable with an upwardly projecting arm 74d of the signal lever 74.

Figure 10:
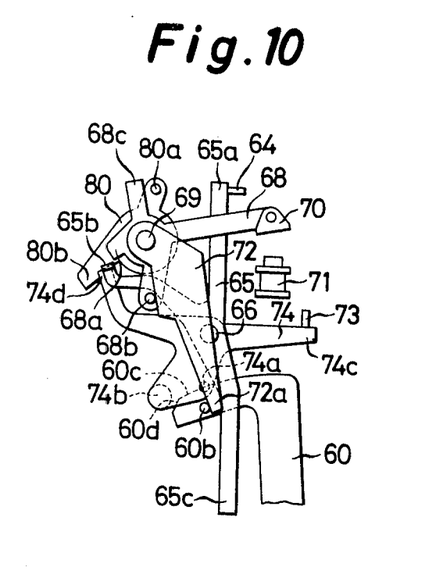
FIG. 10 is a view showing the positions of the principal parts in FIG. 9 when the electromagnet remains unenergized upon tripping the shutter.

Accordingly, when the anchor lever 68 is turned counterclockwise as above, the second blind retaining lever 79 is turned in a counterclockwise direction, releasing the shutter closing member from its cocked position, and the signal retaining lever 80 is also turned counterclockwise. Since the pin 74b on the signal lever 74 at this time is still in sliding contact with the cam surface 60c of the control member 60 and the lever 74 is therefore retained in the posture shown in FIG. 9, the counterclockwise movement of the signal retaining lever 80 brings the hook 80b into engagement with the upper end of the upwardly projecting arm 74d of the signal lever 74, the lever 80 thus preventing the lever 74 from turning counterclockwise. As a result, even if the stepped portion 60d reaches the position of the pin 74b as the control member 60 moves further in the clockwise direction, the signal lever 74 is not turnable in a counterclockwise direction. Now the parts are in positions shown in FIG. 10.

Thus the arm 74c of the signal lever 74 can not move the mirror operating lever 73, and the mirror retaining lever 47 is in the first position to prevent the mirror driving lever 50 and mirror 53 from returning from the photographing position to the observing position as seen in FIG. 8. Furthermore, even if the shutter closing member is released from its cocked position, the shutter opening member is still held in its cocked position, so that as already stated the closing member travels a small distance and is then disengaged by the opening member.

The control member 60 turns further clockwise and, almost in the final stage of its movement, turns the first blind retaining lever 75 in a clockwise direction, thereby releasing the first blind driving lever 78 from cocked position to permit the travel of the shutter opening member. At the same time, the closing member which has been retained by the opening member travels, with the result that both the shutter opening and closing members travel without opening the shutter, namely without making an exposure. In response to a signal indicating the completion of travel of the shutter closing member, the mirror 53 starts to return to the observing position but, in the course of the return movement, the mirror driving lever 50 is engaged by the mirror retaining lever 47. The mirror 53 is consequently prevented from returning. An unusual image appears within the finder, notifying that the power source battery has been consumed.

The switching effecting lever 64 is then set for mechanical exposure time control, whereby the mirror retaining lever 47 is pushed to the second position and releases the mirror driving lever 50, allowing the mirror 53 to return to the normal observing position. The subsequent shutter cocking action brings the parts to the cocked position for mechanical exposure time control, making the shutter mechanism ready for taking a photograph under mechanical exposure time control.

In the foregoing procedure, the shutter may be cocked before the manipulation of the switching effecting lever 64 to cock the parts to the positions shown in FIG. 9, followed by setting of the lever 64 for mechanical exposure time control to bring the mirror 53 back to the normal observing position as already described.

The present embodiment will be described below in the case where the switching effecting lever 64 is set in position from mechanical exposure time control.

When the switching effecting lever 64 is set for mechanical exposure time control, the mirror retaining lever 47 is pushed to the second position (the phantom-line position in FIG. 8) and is thereby retracted from the path of movement of the mirror driving lever 50 and will not impede the return of the mirror 53. Furthermore, under the action of the spring 67, the mechanical latch lever 65 follows the switching effecting lever 64 turning in a clockwise direction, and is stopped upon contact with the pin 74a on the signal lever 74 which pin serves also as a stopper. In brief, the mechanical latch lever 65 is set in the first position.

With the latch lever 65 set in the first position, the end lug 65b is in the path of movement of the rear end 68a of the anchor lever 68 when the lever 68 turns counterclockwise, while the lower end 65c is in the path of advance of the upper end lug 81a of the lever 81 during the clockwise turning of the intermediate lever 81.

The intermediate lever 81 is pivoted to a pin 82 and has a lower end 81b positioned in the path of advance of a pin 78b on the first blind driving lever 78 during the clockwise movement of the lever 78.

When the shutter is tripped with the parts positioned as above, the electromagnet 71 will not be energized as in the case of FIG. 1 even if the clockwise movement of the cam retaining lever 63 closes the power source switch, since the circuit of the electromagnet is kept open. The control member 60, releases from its cocked position, starts to turn in a clockwise direction, causing the pin 60b thereon to turn the holding lever 72 in a counterclockwise direction to relieve the anchor lever 68 of the clockwise pressure.

The anchor lever 88 is biased in a counterclockwise direction, with the electromagnet 71 in unenergized state. Consequently, the lever 68 starts to turn in a counterclockwise direction, but since the rear end 68a comes into engagement with the end lug 65b of the mechanical altch lever 65 and the lever 68 is prevented from further counterclockwise movement before it releases the shutter closing member, the second blind retaining lever 79 continues to hold the shutter closing member. The engagement between the anchor lever 68 and the mechanical retaining lever 65 is maintained with a frictional force acting on the engaging portion as in FIG. 1.

Before the anchor lever 68 comes into engagement with the latch lever 65, the hook portion 80b of the signal retaining lever 80 which follows the anchor lever 68 to turn in a counterclockwise direction engages the end of the upwardly projecting arm 74d of the signal lever 74, which is thereby prevented from counterclockwise movement.

Figure 11:
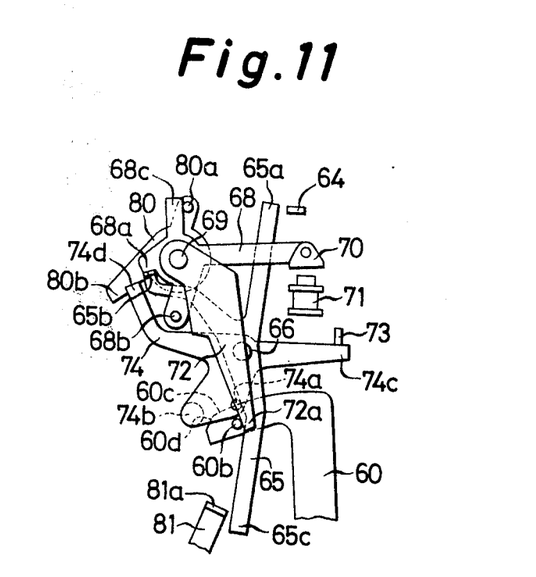
FIG. 11 is a view showing the embodiment of FIG. 9 as set for mechanical exposure time control, the member for actuating a shutter closing member being illustrated when in latched position upon tripping the shutter.

As the control member 60 turns further clockwise, the stepped portion 60d thereof reaches the position of the pin 74b on the signal lever 74, but the lever 74 is not turnable in a counterclockwise direction. The parts are now positioned as illustrated in FIG. 11.

The control member 60 continues to turn clockwise and, almost in the final stage of its movement, turns the first blind retaining lever in a clockwise direction as already described, whereupon the first blind driving lever 78 is latched out to permit the travel of the shutter opening member and to thereby initiate an exposure making operation.

This movement of the first blind driving lever 78 causes the pin 78b thereon to turn the intermediate lever 81 in a clockwise direction, so that the upper end lug 81a of the lever 81 comes into contact with the lower end 65c of the mechanical latch lever 65 and overcomes the frictional force of engagement between the anchor lever 68 and the mechanical latch lever 65, forcing the lever 65 to turn in a counterclockwise direction. The lever 65 therefore releases the anchor lever 68 therefrom.

With the counterclockwise torque given by the spring acting on the lever 68, the lever 68 pushes the second blind retaining lever 79 in a counterclockwise direction and frees the shutter closing member from engagement therewith, whereupon the closing member travels to complete an exposure under mechanical exposure time control.

In response to a signal indicating the completion of travel of the shutter closing member, the mirror driving lever 50 returns in a counterclockwise direction and brings the mirror 53 back to the normal observing position.

When the control member 60 is turned in a counterclockwise direction by a cocking action, the cocking arm 60f of the control member 60 pushes a pin 78b on the first blind driving lever 78, thereby turning the lever 78 counterclockwise to its cocked position.

Figure 12:
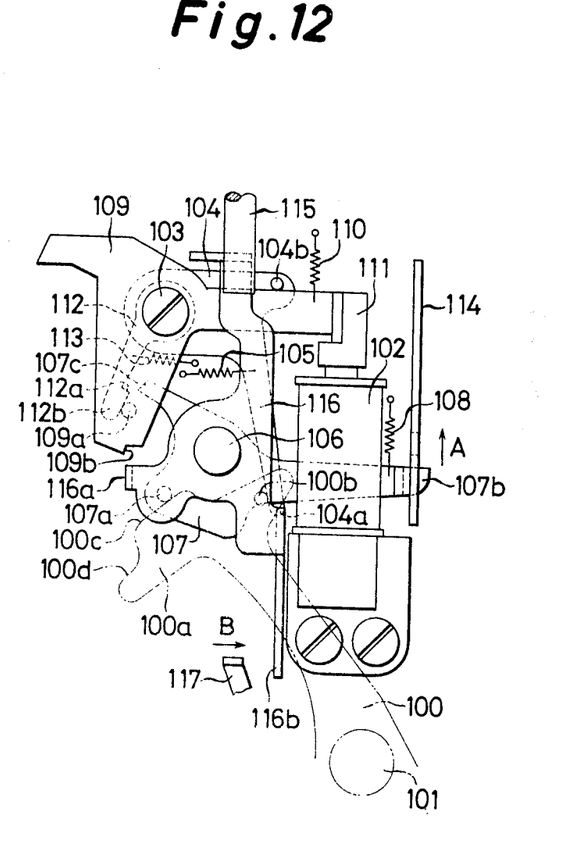
FIG. 12 is a front view showing the principal portion of another embodiment when the shutter is in cocked position for electronic exposure time control.

FIG. 12 shows the principal parts of another embodiment in which means for driving the shutter opening member and means for retaining a control member 100 are substantially the same as those of FIG. 9 and are not shown therefore. Furthermore the means for driving and retaining the mirror are identical to those shown in FIG. 8.

FIG. 12 shows an electronic shutter in cocked position as set for electronic exposure time control. If the power source battery has a voltage high enough to assure proper operation of an electromagnet 102, an unillustrated magnetic switch will be closed in operative relation to the swing-up motion of the mirror caused by a shutter tripping action and the electromagnet 102 is energized. The control member 100, released from its cocked position, is initiated into clockwise movement about a pin 101 by the force of an unillustrated spring.

By virtue of the clockwise movement of the control member 100, a pin 100b on the head 100a of the member 100 pushes the lower end 104a of a holding lever 104 supported by a pivot 103 and urged by a spring 105 in a clockwise direction, thereby turning the lever 104 in a counterclockwise direction.

The holding lever 104 in cocked position presses, with its pin 104b, an anchor lever 109 in a clockwise direction. The anchor lever 109 is also mounted on the pivot 103 and biased in a counterclockwise direction by a spring 110 which is weaker than the spring 105. An attraction piece 111 attached to the end of the lever 104 is therefore pressed against the attracting surface of the electromagnet 102. The aforementioned counterclockwise movement of the holding lever 104 frees the anchor lever 104 from the mechanical pressure, so that the spring 110 gives a counterclockwise torque to the lever 109, but the energized electromagnet 102 holds the attraction piece 111 attracted thereto and electrically retains the lever 109 in its cocked position.

The head 100a of the control member 100 is further formed with a cam surface 100c and a stepped portion 100d extending therefrom. A signal lever 107 is pivoted to a pin 106 and urged by a spring 108 in a counterclockwise direction. When in cocked position, a pin 107a on the signal lever 107 is in sliding contact with the cam surface 100c.

Accordingly, as the control member 100 further turns in a clockwise direction, the stepped portion 100d continuous with the cam surface 100c reaches the position of the pin 107a on the signal lever 107, whereupon the pin 107a drops onto the stepped portion 100d, permitting the signal lever 107 to turn in a counterclockwise direction under the action of a spring 108. A mirror retaining lever 114 set in a first position is therefore pushed in the direction of the arrow A to a second position by the end 107b of the lever 7. As in the foregoing embodiments, the mirror 114 thus brought to the second position no longer blocks the mirror in the course of its return movement. Through the counterclockwise turning of the signal lever 107, the end 107c of an arm extending from the lever 107 is retracted from the path of clockwise movement of a hook 112a of a signal retaining lever 112 so as to keep the hook 112 out of engagement with the end 107c.

The signal retaining lever 112, mounted on the pivot 103 and urged in a counterclockwise direction by a weak spring 113, has an end 112b bearing against a pin 109a on the anchor lever 109 and is turnable, following the counterclockwise movement of the anchor lever 109.

Approximately in the final stage of clockwise movement of the control member 100, the member 100 opens the trigger switch (not shown) of a known exposure time control circuit for the initiation of counting of exposure time and, at the same time, actuates driving means for an unillustrated shutter opening member to permit the travel of the opening member and to thereby open the shutter.

Upon the completion of counting of the control circuit, the electromagnet 102 is deenergized, allowing the anchor lever 109 to turn in a counterclockwise direction under the action of the spring 110, with the result that drive means for an unillustrated shutter closing member is actuated to travel the closing member and to close the shutter, whereupon an exposure is completed. At this time, the signal retaining lever 112 follows the counterclockwise movement of the anchor lever 109 and is then stopped upon the end 112b coming into contact with the end 107c of the signal lever 107.

In response to a signal indicating the completion of travel of the shutter closing member, the mirror is returned from the photographing position to the observing position to complete the photographing operation.

The shutter is cocked by turning the control member 100 in a counterclockwise direction against the spring force acting thereon by unillustrated cocking means. The counterclockwise turning of the member 100 pushes the pin 107a on the signal lever 107 from the stepped portion 100d onto the cam surface 100c, whereby the lever 107 is turned in a clockwise direction to the illustrated position against the spring acting thereon. Being spring-loaded, the holding lever 104 follows the foregoing movement of the control member 100 by contact with the pin 100b and turns in a clockwise direction. In the course of the turning of the lever 104, the lever 104 causes the pin 104b to push the anchor lever 109 in a clockwise direction against the spring acting thereon, bringing the attraction piece 111 into pressing contact with the attracting surface of the electromagnet 102. The parts are therefore returned to the illustrated position. The signal retaining lever 112 is turned together with the anchor lever 109 by being pushed by the pin 109a on the lever 109. Through the action of known means, the shutter opening member and closing member are also cocked at the same time. Furthermore, the mirror retaining lever 114 is brought back to the first position simultaneously with the shutter cocking action or by a suitable setting member.

If the shutter is tripped when the parts are set for electronic exposure time control but the electromagnet 102 is no longer normally operable due to the drain of power source battery, the control member 100 initiated into clockwise movement turns the holding lever 104 in a counterclockwise direction, freeing the anchor lever 109 from the pressure exerted by the pin 104b, so that the lever is subjected to the action of the spring 110. On the other hand, although the magnetic switch is closed upon tripping the shutter, the electromagnet 102 fails to give a magnetic force sufficient to hold the anchor lever 109 electrically or remains unenergized. Accordingly, when relieved of the pressure, the lever 109 turns counterclockwise to move the attraction piece 111 away from the attracting surface of the electromagnet 102. Following this movement, the signal retaining lever 112 turns in a counterclockwise direction and brings its hook 112a into engagement with the end 107c of arm of the signal lever 107 to latch the lever 107 in the illustrated position.

The control member 100 turns further clockwise and brings the stepped portion 100d thereof to the position of the pin 107a on the signal lever 107, but since the lever 107 is latched by the signal retaining lever 112 against counterclockwise movement, the pin 107a is unable to drop onto the stepped portion 100d. Consequently, the mirror retaining lever 114 remains in the first position where it blocks the mirror in the course of return motion to the observing position.

The control member 100, almost in the final stage of its clockwise movement, opens the trigger switch and, at the same time, initiates the drive means for the shutter opening member. Simultaneously with this, the anchor lever 109, turning counterclockwise to follow the holding lever 104, actuates the drive means for the shutter closing member, with the result that the shutter opening and closing members travel in overlapping relation without opening the shutter, namely without making an exposure.

In response to a signal indicating the completion of travel of the shutter closing member, the mirror starts to return, but the mirror retaining member 114 in the first position blocks the mirror in the course of return movement as already described with reference to FIG. 8, notifying the photographer that the electromagnet is not normally operable.

When the shutter is cocked in this state, the pin 107a on the holding lever 107 is brought into contact with the cam surface 100c of the control member 100, and the holding lever 104 thereafter brings the attraction piece 111 at the end of the anchor lever 109 into pressing contact with the attracting surface of the electromagnet 102. Consequently when the signal lever 107 is disengaged from the signal retaining lever 112, the lever 107 is held by the control member 100 against counterclockwise movement and the mirror therefore remains engaged by the retaining lever 114, continuously giving the warning of the failure of the electromagnet 102.

In this state, accordingly, the apparatus is not operable under electronic exposure time control. If the photographer wishes to continue the photographing operation, whereas a new battery is not available or the electromagnet fails to operate for some other cause, the camera will be made ready for taking photographs by switching the apparatus to mechanical exposure time control.

As already described with reference to FIG. 6, the shutter speed dial or like switching effecting member is manipulated to set the indication of mechanical exposure time control to the index mark, whereby an operation pin 115 is moved rightward to shift a mechanical latch lever 116 pivoted to a pin 106 in a clockwise direction from the illustrated second position to the first position. At the same time, by means of an unillustrated member coupled to the operation pin 115, the mirror retaining lever 114 is shifted from the first position to the second position to release the mirror and permit the same to return to the normal observing position.

When the mechanical latch lever 116 is shifted to the first position, the lug 116a of the lever is brought to the path of counterclockwise movement of a stepped portion 109b formed in the anchor lever 109, while the lower extension 116b of the latch lever 116 is positioned into the path of movement of an intermediate member 117 such as X contact opening and closing member to be operated by the travel of the shutter opening member.

The shutter is tripped in this state to actuate the control member 100 in operative relation to the swing-up motion of the mirror to the photographing position. Even if the magnet switch is closed, the electromagnet 102 remains unenergized.

With the clockwise movement of the control member 100, the holding lever 104 turns in a counterclockwise direction and relieves the anchor lever 109 of the clockwise pressure, permitting the spring 110 to act on the anchor lever 109, but the counterclockwise movement of the anchor lever 109 brings the stepped portion 109b into engagement with the lug 116b of the mechanical latch lever 116. Thus, the lever 109 still fails to move the attraction piece 111 from the electromagnet 102 or the lever 109 slightly turns counterclockwise and is prevented from further movement without releasing the shutter closing member.

Approximately in the final stage of clockwise movement of the control member 100, the shutter opening member is initiated into travel to commence an exposure as already described.

The intermediate member 117 to be operated by the travel of the opening member is moved in the direction of the arrow B as by being pushed by the opening member and is brought into contact with the lower extension of the mechanical latch lever 116, which in turn is moved in a counterclockwise direction from the first position to the second position.

Consequently, the anchor lever 109 is disengaged from the lug 116a and is turned in a counterclockwise direction under the action of the spring 110, thereby bringing the shutter closing member into travel to complete an exposure.

In response to the signal of completion of travel of the closing member, the mirror is freed from the photographing position and returned to the observing position. At this time, the mirror retaining lever 114 which is set in the second position does not interfere with the return action of the mirror. Further in the foregoing operation, the signal lever 107 need not be retained in the illustrated position but may be permitted to turn, following the clockwise movement of the control member 100, free of engagement with the signal retaining lever 112.

What is claimed is:

1. A single lens reflex camera having an electronic shutter comprising:
   a focal plane shutter including a shutter opening member and a shutter closing member,
   control means for electrically controlling exposure time, the control means including an electromagnet having a normally operable condition for controlling actuation of the closing member and a power source for the electromagnet,
   a mirror moveable between an observing position and a photographing position,
   means for driving the mirror to each of the positions, means including an attraction member having an attraction piece holdable and attractable to the attracting surface of the electromagnet when said electromagnet is energized and spring biased in a direction to move the attraction piece away from the electromagnet for moving the shutter closing member when said electromagnet is deenergized,
   means for switching between electronic exposure time control and mechanical exposure time control,
   means including a control member moveable in operative relation to the movement of the mirror to the photographing position for actuating the shutter opening member after permitting, in the course of its movement, the attraction member under the influence of the spring bias thereon to move the attraction piece from the electromagnet,
   a mechanical latch member selectively transferrable by said switching means between a first position where the latch member can latch the attraction member before the attraction member actuates the shutter closing member and a second position where the latch member is independent of the movement of the attraction member, the latch member, when in the first position, being moveable to the second position in operative relation to the travel of the opening member, and
   a regulating member moveable in operative relation to the switching means to retain the mechanical latch member in the second position when the switching means is set in position for electronic exposure time control.

2. The camera as set forth in claim 1 further comprising:
   a blocking member movable between a first position for preventing return of the mirror from the photographing position to the observing position and a second position where the blocking member permits return of the mirror, the blocking member being disposed in the first position when the camera is set for electronic exposure time control and in the second position when the electromagnet is in its normally operable condition, and also when the camera is set for mechanical exposure time control,
   a signal member controllable by the control member and the attraction member to shift the blocking member to the second position upon the attraction member detecting that the electromagnet is in its normally operable condition and to retain the blocking member in the first position upon detecting that the electromagnet is not in its normally operable condition, and
   an operation member moving the blocking member to the second position in operative relation to the movement of the switching means to its mechanical exposure time control position.

3. The camera as set forth in claim 2 wherein the control member is turnable in a first direction by a shutter cocking action to mechanically press the attraction piece of the attraction member against the attracting surface of the electromagnet, the control member further being movable in a direction opposite to said first direction in operative relation to the movement of the mirror to its photographing position upon a shutter tripping action to free the attraction member from the mechanical pressure in the initial pressure in the initial stage of its movement, thereby permitting a force to act on the attraction member to move the same from the electromagnet, the control member being operable to actuate the shutter opening member proximate the final stage of the movement of the control member.

4. The camera as set forth in claim 3 wherein the control member comprises a first cam for controlling the attraction member, a second cam for actuating the shutter opening member and a third cam for controlling the signal member.

5. The camera as set forth in claim 3 wherein the control member comprises a portion for controlling the attraction member, a portion for actuating the shutter opening member and a cam portion for controlling the signal member.

* * * * *